(12) United States Patent
Farsaie et al.

(10) Patent No.: US 8,213,011 B2
(45) Date of Patent: Jul. 3, 2012

(54) SPATIAL IMAGING/IMAGING SPECTROSCOPY SYSTEM AND METHOD (75) Inventors: Ali Farsaie, New Bern, NC (US); W. Fred McClure, Raleigh, NC (US)

(73) Assignee: Image Analytics, Inc. NC (US)

( * ) Notice: Subject to any disclaimer, the term of this patent is extended or adjusted under 35 U.S.C. 154(b) by 0 days.

(21) Appl. No.: 12/364,791

(22) Filed: Feb. 3, 2009

(65) Prior Publication Data
US 2010/0195111 A1 Aug. 5, 2010

(51) Int. Cl.
G01N 21/25 (2006.01)
(52) U.S. Cl. ........................ 356/416
(58) Field of Classification Search ............... 356/416, 356/456, 450, 445
See application file for complete search history.

(56) References Cited

U.S. PATENT DOCUMENTS

| | | | |
|---|---|---|---|
| 6,043,885 A | * | 3/2000 | Mazuet et al. ............. 356/521 |
| 2008/0094630 A1 | * | 4/2008 | Mieher et al. ............. 356/401 |

* cited by examiner

Primary Examiner — Tarifur Chowdhury
Assistant Examiner — Abdullahi Nur
(74) Attorney, Agent, or Firm — Fay Sharpe LLP (57) ABSTRACT A system and method for spatial imaging and imaging spectroscopy system includes a sample holder for holding samples, an illumination system arranged to illuminate the samples, a wavelength isolation module configured to selectively isolate received illumination from the samples to a plurality wavelengths, a single matrix imaging device arranged to receive the isolated wavelengths from the wavelength isolation module through a single lens system, and a computing device configured to perform a spatial imaging and imaging spectroscopy process. The spatial imaging and imaging spectroscopy process includes acquiring image data corresponding to each of the isolated wavelengths, performing spatial imaging analysis based on the acquired image data, and performing imaging spectroscopy on the acquired image data.

20 Claims, 9 Drawing Sheets

```
Object Detected:    18
       ┌── 104              106                      108
       ↓                     ↓                        ↓
1.       Pixels = 7366        Area = 9.395mm2
         Rect Size = 5.536mm x 1.857mm ──── 110
         Average Intensity = 114 ──── 112
         Diameters = 1.821mm  1.750mm  1.679mm  ←── 114

2.       Pixels = 9194        Area = 11.727mm2
         Rect Size = 2.143mm x 5.607mm
         Average Intensity = 142
         Diameters = 2.107mm  2.107mm  2.107mm 3.       Pixels = 7730        Area = 9.860mm2
         Rect Size = 5.429mm x 2.036mm
         Average Intensity = 89
         Diameters = 1.821mm  2.000mm  2.000mm 4.       Pixels = 6807        Area = 8.682mm2
         Rect Size = 1.750mm x 5.250mm
         Average Intensity = 82
         Diameters = 1.679mm  1.679mm  1.679mm 5.       Pixels = 7483        Area = 9.545mm2
         Rect Size = 2.071mm x 5.250mm
         Average Intensity = 137
         Diameters = 1.821mm  1.393mm  1.929mm
```

Fig. 9

SPATIAL IMAGING/IMAGING SPECTROSCOPY SYSTEM AND METHOD

BACKGROUND

Electronic imaging is an important analytical tool for modern scientific evaluations. The field can be divided into two specific areas: (1) Spatial and (2) Hyper-spectral (also referred to as imaging spectroscopy, as referred to hereinafter). Spatial imaging provides physical measurements such as, e.g., length, width, height, etc., of a sample or product. Imaging spectroscopy provides physio-chemical determinations such as, e.g., chemical composition, particle size, etc., of a sample or product. Imaging spectroscopy has the intrinsic ability to make composition measurements at a single site (e.g., pixel) and a composition-distribution measurement at several sites (e.g., pixels). Composition distribution measurements are particularly helpful for determining the exact location of components in growing plants. For example, measurement of the concentration as well as the distribution of chlorophyll, anthocyanins, and other components can provide useful information about the viability of the plant, e.g., survivability and vigor.

There are Industries needing equipment that will measure both spatial and chemical distribution parameters in support of processes leading to marketable products. Embryo production leading to tree-seedlings is but one of these industries needing help. However, there is a, heretofore unaddressed need for the combination of spatial imaging and imaging spectroscopy technologies integrated into a single system.

As an example of the need for an integrated single spatial imaging and imaging spectroscopy system, embryos can be produced by the millions. However, of the embryos produced, only 30% survive long enough to make a tree seedling, a mortality rate that is unacceptable. Survival of this industry depends on two alternatives: (1) The development of embryos that have a lower mortality rate, or (2) development of a method to permit early detection of embryos destined to die and remove them from further processing. Embodiments described herein address the latter of the two options.

Current research in embryo production indicates that there are potentially 24 parameters that, if measured, could provide viability (the ability to survive through the production of a seedling) information leading to more efficient seedling production processes. Of the 24 parameters, eleven are spatial with the remaining being optical (chemically related) properties determinable with an imaging spectrometer. Herein lies the need for a hybrid camera system that enables the simultaneous determination of both spatial and optical properties.

It is to be appreciated that, although the need to measure physical and chemical characteristics has been described with reference to plant material, in particular plant embryos, embodiments described herein are capable of making measurements in other areas, such as, e.g., textiles, pharmaceuticals, cosmetics, agriculture, food, feeds, petroleum, polymers and other known and foreseen areas.

In particular, it is desirable to have a system such that both spatial and imaging spectroscopy information are acquired with one camera through one lens. That is to say, both physical measurements as well as composition analyses are obtained with one camera through one lens.

BRIEF DESCRIPTION

A system for spatial imaging and imaging spectroscopy system is provided. The system includes a sample holder for holding samples, an illumination system arranged to illuminate the samples, a wavelength isolation module configured to selectively isolate received illumination from the samples to a plurality wavelengths, a single matrix imaging device arranged to receive the isolated wavelengths from the wavelength isolation module, and a computing device configured to perform a spatial imaging and imaging spectroscopy process. The spatial imaging and imaging spectroscopy process includes acquiring image data corresponding to each of the isolated wavelengths, performing spatial imaging analysis based on the acquired image data, and performing imaging spectroscopy on the acquired image data. The spatial imaging analysis is performed on spectral data corresponding to individual wavelengths of the isolated wavelengths and/or computed spectral indices computed from a combination of wavelengths of the isolated wavelengths.

Also provided is a method for spatial imaging and imaging spectroscopy. The method includes illuminating samples, isolating selected wavelengths reflected from the samples (the isolating performed by controlled operation of a wavelength isolation module), receiving the isolated wavelengths from the wavelength isolation module by a single matrix imaging device, and performing a spatial imaging and imaging spectroscopy process on a computing device. The spatial imaging and imaging spectroscopy process includes acquiring image data corresponding to each of the selected wavelengths, performing spatial imaging analysis based on the acquired image data, performing imaging spectroscopy on the acquired image data, and displaying results of the spatial imaging analysis and the imaging spectroscopy on a display device. The spatial imaging analysis is performed on spectral data corresponding to individual wavelengths of the isolated wavelengths and/or computed spectral indices computed from a combination of wavelengths of the isolated wavelengths.

DETAILED DESCRIPTION

Disclosed herein are a system and method for spatial Imaging and imaging spectroscopy. The particular embodiment described consists of five functional components: (1) a matrix imaging camera (MIA), (2) a wavelength isolation module (WIM) sample compartment (SC), (3) a sample illumination system (SIS), (4) a computer interface (CI), (5) a personal computer (PC), and (6) system software (SS).

Figure 1:
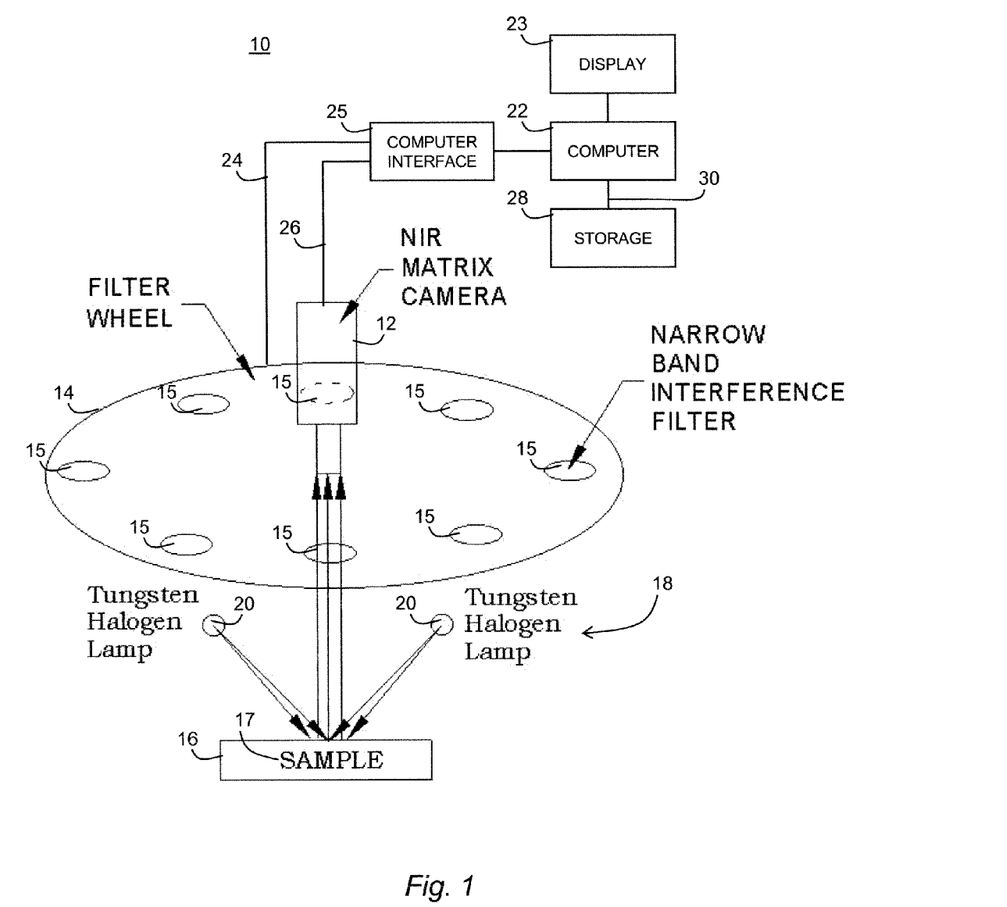
FIG. 1 is a schematic diagram of a spatial imaging/imaging spectroscopy system according to concepts of the present application.

With reference to FIG. 1, a simplified schematic of an exemplary spatial imaging/imaging spectroscopy system 10 and a brief description of the above-described components are first provided. It is to be appreciated that concepts of the present application are not limited to the components or the arrangement of the particular embodiment shown. A matrix imaging camera 12 is a conventional matrix camera whose spectral response and pixel-resolution is selected to meet the demands of the particular problem or set of problems. For example, the camera can be chosen to respond to visible (VIS), near-infrared (NIR), mid-infrared (MIR) radiation, or other regions of the electromagnetic spectrum. The pixel-resolution (or spatial resolution) is determined by the demands of the problem. For example, detection of the distribution of an active ingredient in a tablet demands a camera with a higher resolution than would be required for detecting dimes in a mixture of pennies, dimes, quarters and half-dollars. Therefore, in such a case, a camera with more pixels in the image matrix would be preferable in order to provide a higher spatial resolution.

A wavelength isolation module 14 determines which analytical wavelengths are selected for determining chemical composition. This technology may vary from simple narrow-band interference filters 15 to more complex modules such as, e.g., monochromators. A monochromator is an optical device that transmits a selectable narrow band of wavelengths of light or other radiation chosen from a wider range of wavelengths available at the input to the monochromator. Monochromators may utilize holographic gratings, prisms (or a combination of the two), acousto-optical tunable filters (AOTF) or diode-emitter arrays. Monochromator-based systems are referred to as "scanning systems" and are designed to provide "full-spectrum" information needed for more demanding applications requiring concentration distributions. More detailed information may be found in "NIR imaging spectroscopy: A fascinating frontier," W. F. McClure, 1991, NIR news 2 (2): 8-10, and "NIR Imaging Spectroscopy: Measuring The Distribution of Chemical Components," S. K. Taylor and W. F. McClure, 1990, in "Near Infrared Spectroscopy Proceedings of the 2nd International Conference," ed. M. Iwamoto and S. Kawano: 393-404, Tokyo, Japan: Korin Publishers., the disclosures of which are incorporated herein in their entirety by reference.

A sample compartment 16 or holder is provided for placement of the sample material 17 or materials being analyzed. The sample material is illuminated by a sample illumination system 18. Acquisition of images, both for spatial and for imaging spectroscopy, requires that the sample 17 be illuminated in the reflectance mode. A quartz tungsten-halogen lamp, e.g., is suitable for making visible and near-infrared measurements. In the exemplary embodiment shown, four pre-focused quartz tungsten-halogen lamps 20 are provided. The lamps are preferably focused at a 45 degree angle to the surface of the sample material 17. The matrix imaging camera 12 is preferably mounted with its optical axis at a 90 degree angle to the surface of the sample 17. This mode of illuminating and detecting is referred to as the "45/90 mode." It is an arrangement that largely eliminates the specular reflectance component, the component of reflection that contains no composition information.

It is to be appreciated again, however, that the particular angles and arrangement described for the exemplary embodiment, and embodiments described herein are not limited to this arrangement.

The exemplary embodiment shown has two interface requirements: (1) Positioning the filters 15 and (2) Data transfer to and from the matrix imaging camera 12. Both functions are controlled by software or programs operating on a personal computer 22 including a display device 23 for displaying results of the spatial imaging and imaging spectroscopy. A computer interface 25 is operatively connected to, or incorporated within the personal computer 22, which is further operatively connected to the matrix imaging camera 12 and the wavelength isolation module 14 for enabling interfacing according to the above-described interface requirements. In one embodiment, e.g., filter 15 positioning is coordinated through a 16-pin serial (D-connector) filter interface cable 24, and data acquisition control and transfer is handled via an IEEE 1394 data acquisition interface 26, such as, e.g., Apple Inc.'s FireWire.

The personal computer 22 may be any personal computer running an operating system such as, e.g., Windows XP or any other computing device suitable for controlling the spatial imaging/imaging spectroscopy system 10. Imaging of any type typically requires large amounts of storage space, and hence, the personal computer 22 preferably has access to a storage system 28 either incorporated within the personal computer 22, or remotely available to the personal computer 22 via, e.g., a network link 30.

System software programs 32 operating on the personal computer 22 include routines for: standardizing the camera, acquiring images, calculating image differences, calculating image ratios and calculating absorbance images.

Operation

Figure 2:
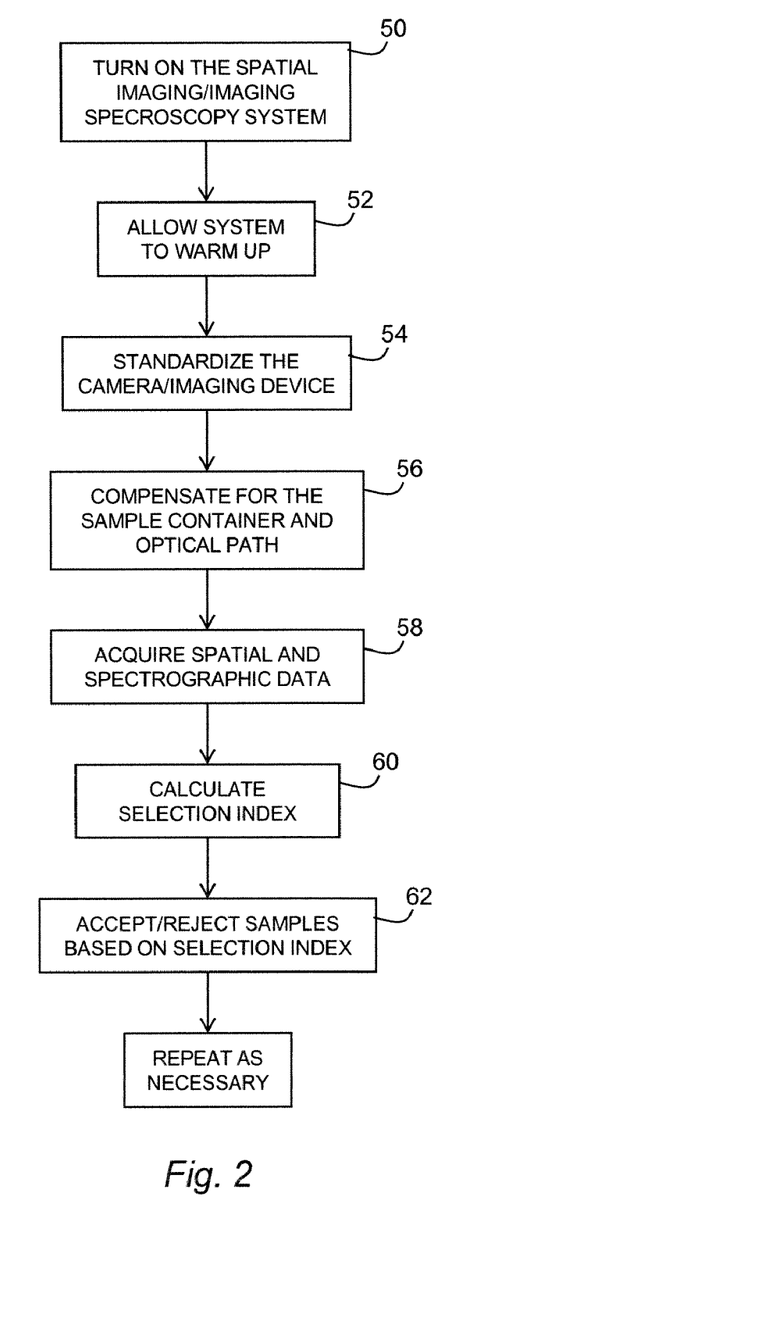
FIG. 2 is a flowchart of steps performed by an embodiment of the spatial imaging/imaging spectroscopy system.

With reference now to FIG. 2, and continuing reference to FIG. 1, a flow chart is shown which illustrates operation of the exemplary spatial imaging/imaging spectroscopy system 10. As previously described, the spatial imaging/imaging spectroscopy system 10 includes five functional components: the matrix imaging camera 12, the wavelength isolation module 14, the sample compartment 16, the sample illumination system 18, the computer interface 25, the personal computer 22, and the system software 32. The following is a brief description of operation of the system for an exemplary spatial imaging/imaging spectroscopy test procedure.

For the particular exemplary application, a 1280×1024 matrix camera is chosen. Camera response is chosen for the particular application, and for this test procedure, a CCD camera having a spectral sensitivity from 400-1050 nanometers (nm) is used. InGaAs matrix-detectors may be used if sensitivity is needed in the range 1050-2500 nm. Vision of the camera is restricted to certain narrow-bands by specifying the central wavelength of narrow-band interference filters 15.

After turning on the matrix imaging camera 12 (step 50), and allowing sufficient warm up time (step 52), due to the variation in the spectral sensitivity of a CCD matrix camera, it is standardized against a ceramic reference (step 54). This process determines how long the optical intensity at each wavelength must be integrated in order to produce equivalent response at each wavelength. The standardization process records the reading from an 800 nm filter as a basis for the exemplary embodiment. Of course, other appropriate bases may be used, and other methods of standardizing the camera may be used as known in the art.

Once the camera 12 is standardized, measurement of the sample 17 can begin. Remaining steps in the sample measurement procedure include performing any necessary compensation (step 56) required for the sample 17 container 16. After compensation, the software programs 32 operating on the personal computer 22 controls the wavelength isolation module 14, and the spatial and spectral data is acquired (step 58) via the data acquisition interface 26. A selection index is then computed on the acquired spatial and spectral data (step 60). The selection index is a computed based on measured spectral and spatial parameters suitable for the sample 17 and the test being performed. The sample (or samples) 17 is then accepted or rejected (step 62) based on the computed selection index. Steps are then repeated as necessary for additional samples.

Exemplary Design and Measurements

An exemplary spatial imaging/imaging spectroscopy procedure is described here. It is to be appreciated, however, that the exemplary procedure is provided only for the purpose of clarifying features of the present application, and the present application is not limited to features of the exemplary procedure. The setup for the exemplary procedure is shown with reference to FIG. 3, and continuing reference to FIG. 1, where like numerals represent like elements.

Figure 3:
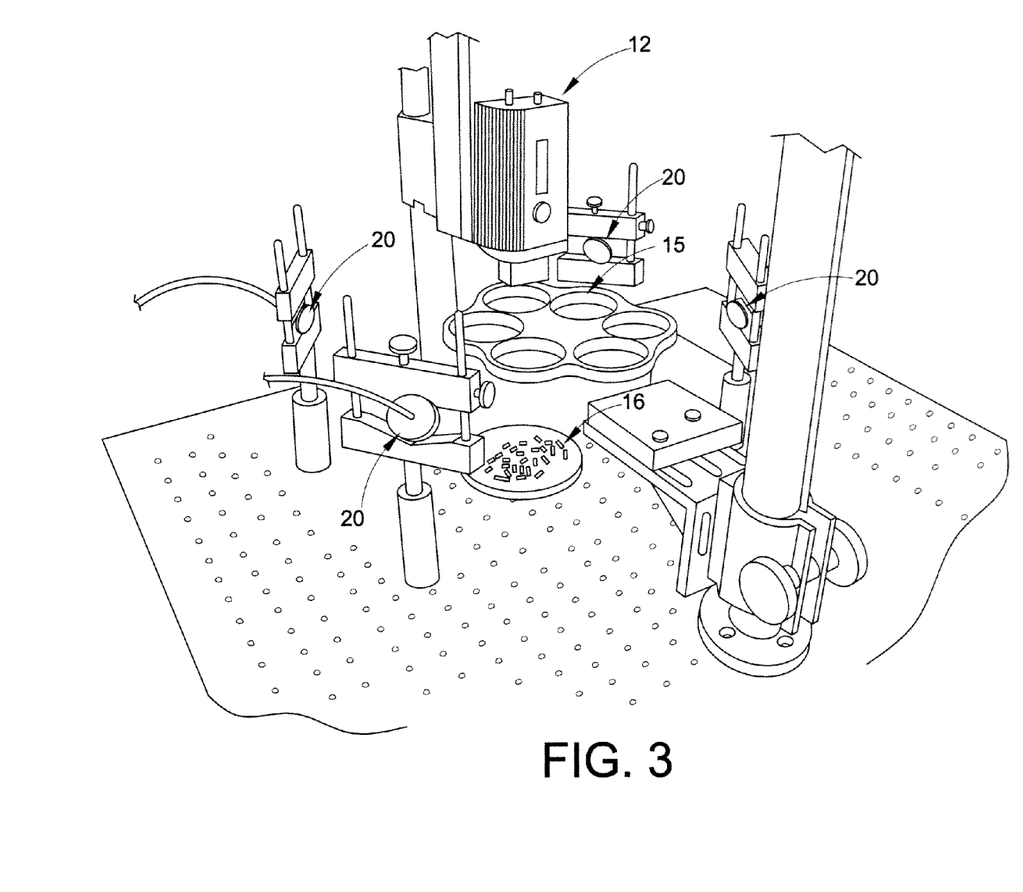
FIG. 3 is an exemplary arrangement of a spatial imaging/imaging spectroscopy system according to concepts of the present application.
Figure 4:
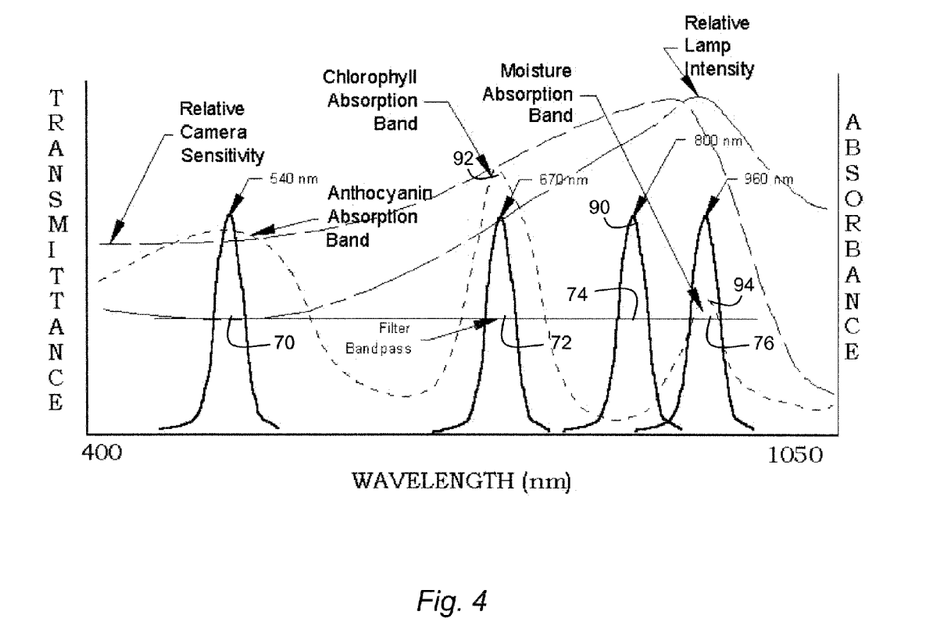
FIG. 4 is a wavelength and filter band diagram corresponding to an exemplary operation of the spatial imaging/imaging spectroscopy system according to concepts of the present application.

A CCD (silicon based) camera having a 1248×1024 matrix implemented (matrix imaging camera 12) is used in the exemplary procedure to measure spatial parameters as well as measure the chlorophyll content (using imaging spectrometry) of samples 17. The sample is illuminated with four tungsten-halogen lamps (illumination system 18). For standardizing the CCD camera (see step 54) the CCD camera takes images of a ceramic reference. The exemplary ceramic is made from a white bathroom or floor tile by placing it in a milling machine or lathe and taking off half the thickness, leaving a smooth surface of energy-diffusing ceramic. The images of the ceramic reference are taken through each of two filters at 670 nm and 800 nm. With reference to FIG. 4, each filter has a 40 nm bandpass 70-76 (Full-Width at Half-Height, FWHH). Similarly, the CCD camera takes images of the sample-plate through the two filters at 670 nm and 800 nm respectively. Each filter having the 40 nm bandpass (Full-Width at Half-Height, FWHH).

The camera reading from the reference ceramic produces an intensity reading at 670 nm defined as:

Measurement of reference ceramic at 670 nm=$I_{R670}$ (1)

The camera reading from the reference ceramic produces an intensity reading at 800 nm defined as:

Measurement of reference ceramic at 800 nm=$I_{R800}$ (2)

The camera reading from the sample produces an intensity reading at 670 nm defined as:

Measurement of sample plate at 670 nm=$I_{670}$ (3)

The camera reading from the sample produces an intensity reading at 800 nm defined as:

Measurement of sample plate at 800 nm=$I_{800}$ (4)

The reflectance at 670 nm is calculated as:

$R_{670}=I_{670}/I_{R670}$ (5)

The reflectance at 800 nm is calculated as:

$R_{800}=I_{800}/I_{R800}$ (6)

The Log 10(1/R) at 670 nm is calculated as:

$\log_{10}(1/R_{670})$ (7)

The Log 10 (1/R) at 800 nm is calculated as:

$\log_{10}(1/R_{800})$ (8)

The chlorophyll content is then calculated from the difference image as:

$CC \approx \Delta I = \log_{10}(1/R_{670}) - \log_{10}(1/R_{800})$ (9)

The actual chlorophyll content then becomes:

$CC = K\Delta I = K(\log_{10}(1/R_{670}) - \log_{10}(1/R_{800}))$ (10)

where K is proportionality constant determined from NIR spectroscopy using calibration samples with known concentrations of chlorophyll.

Assuming that chlorophyll turns out to be viability-criterion for embryo, it will not be necessary to know the exact concentration of chlorophyll. Rather, the system would be required only to separate the high concentrations from the low concentrations—a relative determination.

Figure 5:
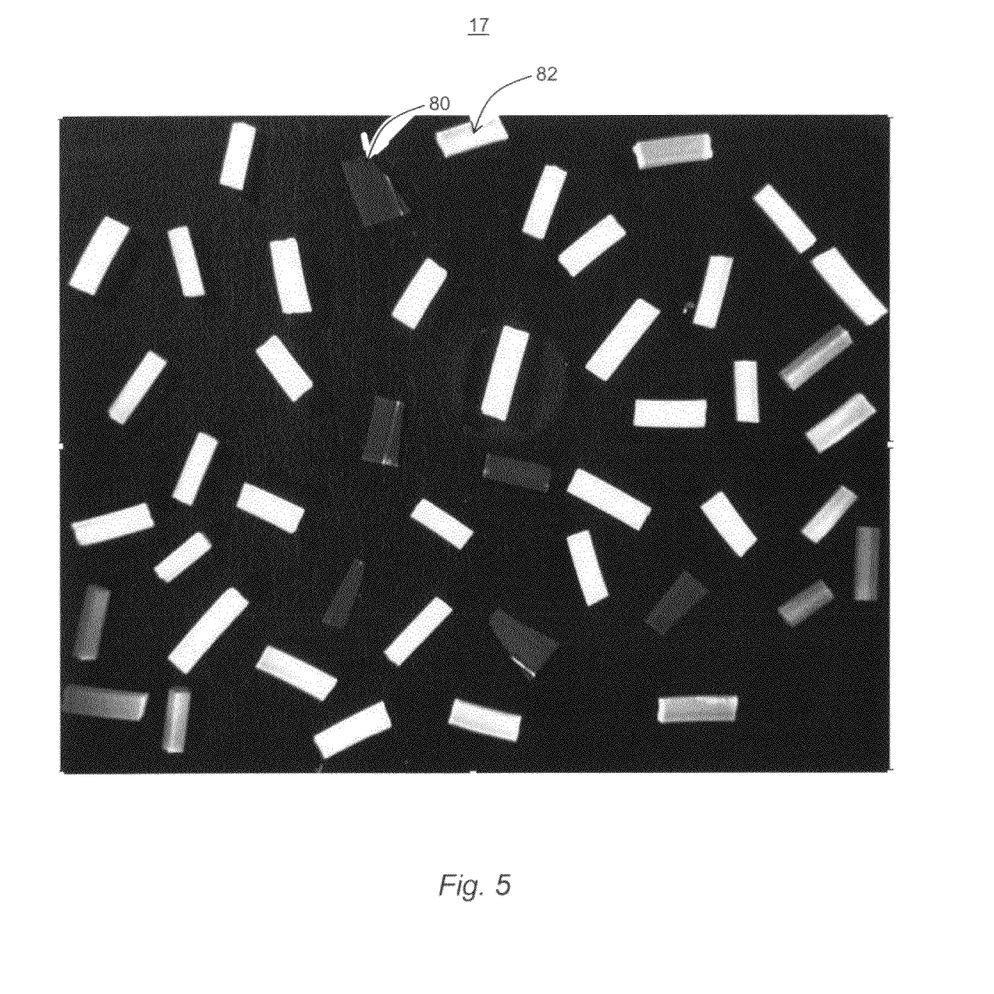
FIG. 5 is an exemplary acquired 670 nm sample image.

Note, with reference to FIG. 5, which is a 670 nm image of the samples 17, that the plant-leaf samples 80 (containing substantial chlorophyll) are darker than the plastic samples 82. This demonstrates that the camera is has been sensitized to chlorophyll absorption by the 670 nm filter. Note also, with reference to FIG. 6, which is an 800 nm image of the samples 17, that the plant-leaf samples 80 look similar to the plastic samples 82. This indicates that the 800 nm filter masks chlorophyll absorption. Note further, with reference to FIG. 7, which shows the results of a difference calculation between the 670 nm image and the 800 nm image, that the difference calculation results in enhancing the image of the plant-leaf samples 80. This validates the technique for determining chlorophyll content of any sample.

Spatial Measurements

Figure 8:
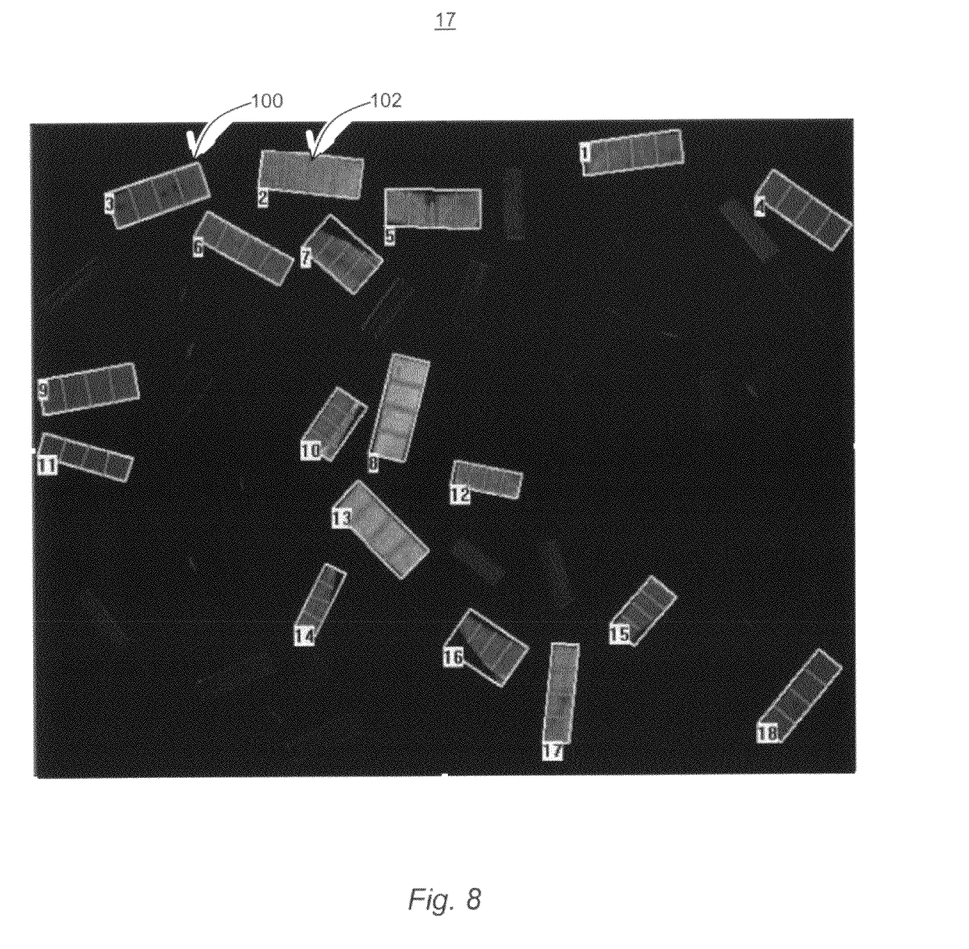
FIG. 8 is an exemplary 800 nm image including spatial criteria imposed on the samples.
Figure 9:
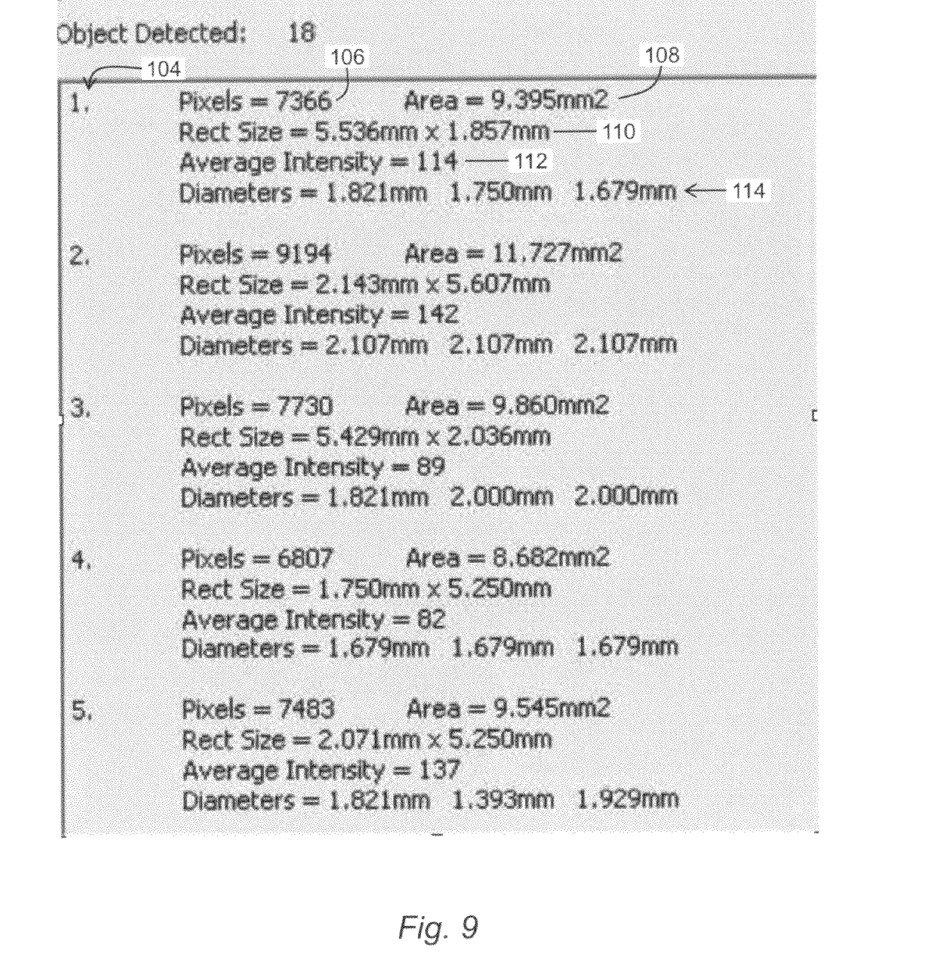
FIG. 9 is an exemplary tabulation of spatial imaging data.

Spatial measurements are also made from acquired image data. For example, with reference to FIG. 4, and continuing reference to FIG. 6, since the 800 nm band 90 lies between the chlorophyll absorption band 92 at 675 nm and the water absorption band 94 at 912 nm, most samples 17 look similar through the 800 nm filter. Therefore, spatial information may be readily obtained from the 800 nm image shown in FIG. 6. With reference to FIG. 8, an 800 nm image is shown with spatial measuring criteria imposed on the samples 17. The exemplary spatial measuring criteria include rectangles 100 surrounding and delineating each sample, and diameters 102 of the samples at intervals within each rectangle. With reference to FIG. 9, exemplary spatial data obtained from the 800 nm image shown in FIG. 8 is provided. The exemplary spatial data includes a reference 104 for each of the samples 17. With each sample reference number, there is provided an associated number of pixels 106, a sample area 108, a rectangle size 110, an average intensity 112, and the measured diameters 114.

Figure 6:
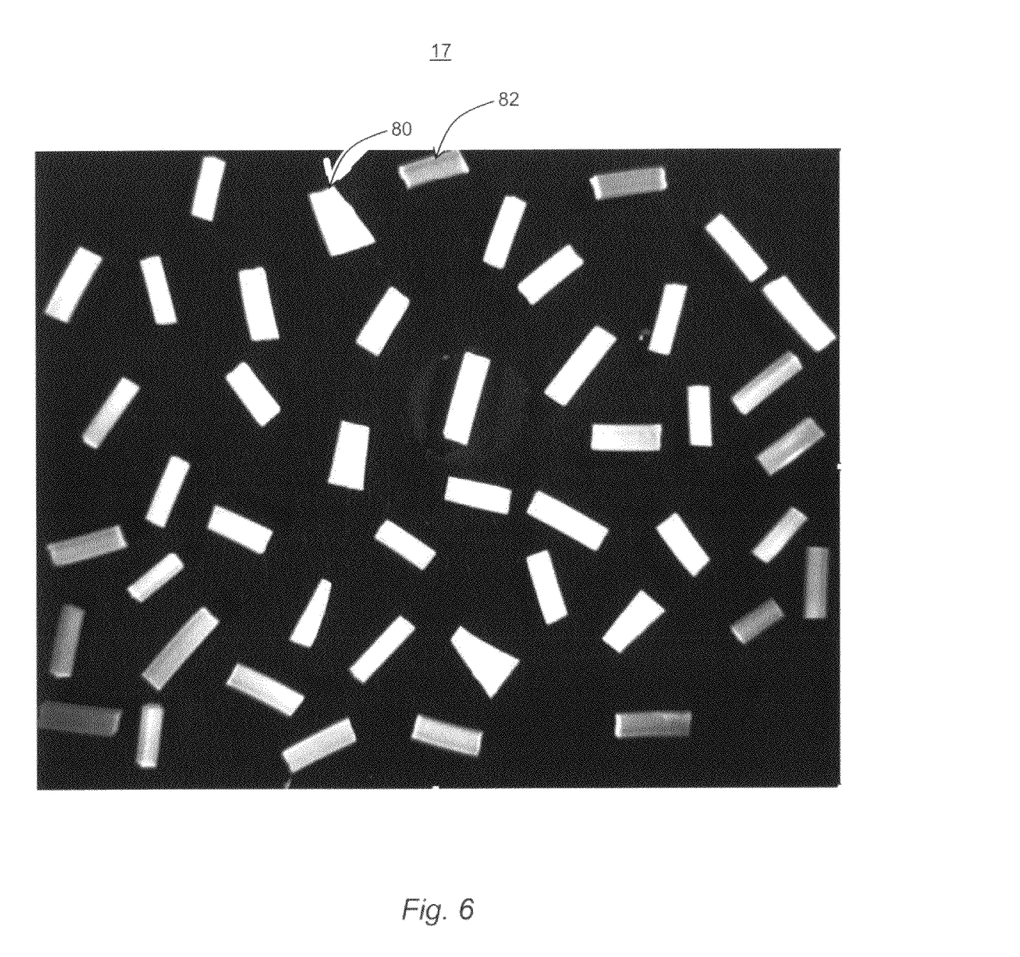
FIG. 6 is an exemplary acquired 800 nm sample image.
Figure 7:
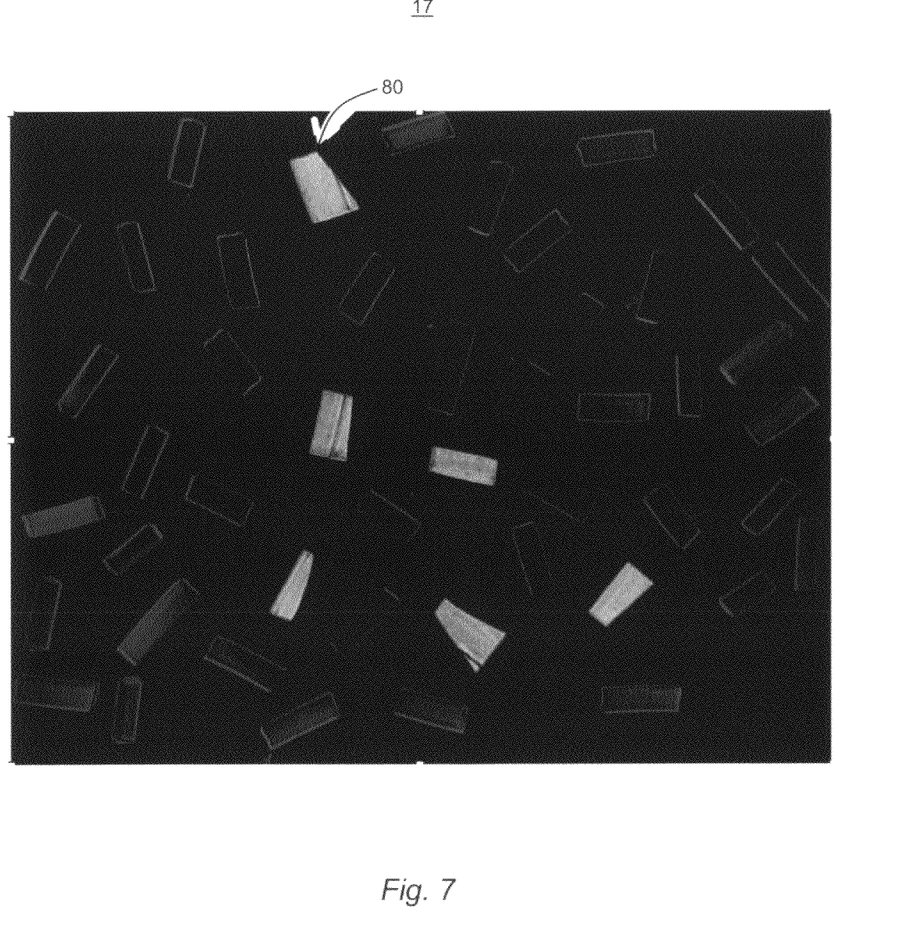
FIG. 7 is a difference image corresponding to the 670 nm sample image minus the 800 nm sample image.

It is to be appreciated that the above described spatial parameters and measurements are exemplary only, and the present application is not limited with regard to spatial measurement parameters or techniques, and may use any technique known in the art. For example, rather than utilizing a single image such as the 800 nm image, the system may sum or integrate images from two or more filters to provide a composite image for spatial measurements. For example, if a whole leaf were to be imaged, the chlorophyll distribution of the leaf could be determined. However, it is noted that the spatial imaging and the imaging spectroscopy, as described herein, is performed with the same matrix imaging camera 12, and are preferably performed on one or more images from the same set of images taken during the test procedure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A spatial imaging and imaging spectroscopy system comprising:
 a sample holder for holding samples;
 an illumination system arranged to illuminate the samples;
 a wavelength isolation module configured to selectively isolate illumination reflected from the samples to a plurality wavelengths;
 a single matrix imaging device arranged to receive the isolated wavelengths from the wavelength isolation module; and
 a computing device configured to perform a spatial imaging and imaging spectroscopy process comprising:
 acquiring image data corresponding to each of the isolated wavelengths;
 performing spatial imaging analysis based on the acquired image data, wherein the spatial imaging analysis is performed on at least one of: spectral data corresponding to individual wavelengths of the isolated wavelengths; and computed spectral indices computed from a combination of wavelengths of the isolated wavelengths; and
 performing imaging spectroscopy on the acquired image data.

2. The system of claim 1, wherein the matrix imaging device comprises a single camera having a single lens system.

3. The system of claim 1, further including:
 a software program operating on the computing device, wherein the computing device is operatively connected to each of the matrix imaging device and the wavelength isolation module, and wherein the software program controls operation of the wavelength isolation module and the matrix imaging device.

4. The system of claim 1, wherein the computing device is further configured to standardize the matrix imaging device to compensate for nonlinearities of the matrix imaging device and nonlinearities of an optical path from the illuminated samples to the matrix imaging device.

5. The system of claim 1, wherein the computing device is further configured to perform the spatial imaging and imaging spectroscopy process for online measurement and control.

6. The system of claim 1, wherein the spatial imaging and imaging spectroscopy system is configured to be selectively adaptable to operation in at least one of a visible wavelength range and a near infrared wavelength range.

7. The system of claim 1, wherein the spatial imaging and imaging spectroscopy system is configured to operate in an industrial setting comprising at least one of: textiles; pharmaceuticals; polymers; petroleum; agriculture; food; and cosmetics.

8. The system of claim 1, wherein the matrix imaging device comprises a digital camera, and wherein the computing device comprises a personal computer.

9. The system of claim 1, wherein the wavelength isolation module comprises a plurality of narrow band interference filters.

10. The system of claim 1, wherein the wavelength isolation module comprises a monochromator.

11. The system of claim 1, wherein the computing device is further configured to perform the spatial imaging analysis based on the acquired image data by utilizing the image data corresponding to a selected one of the isolated wavelengths for performing the spatial imaging analysis.

12. A method for spatial imaging and imaging spectroscopy, the method comprising:
 illuminating samples;
 isolating selected wavelengths reflected from the samples, the isolating performed by controlled operation of a wavelength isolation module;
 receiving the isolated wavelengths from the wavelength isolation module by a single matrix imaging device; and
 performing a spatial imaging and imaging spectroscopy process on a computing device, the process comprising:
 acquiring image data corresponding to each of the selected wavelengths;
 performing spatial imaging analysis based on the acquired image data, wherein the spatial imaging analysis is performed on at least one of: spectral data corresponding to individual wavelengths of the isolated wavelengths; and computed spectral indices computed from a combination of wavelengths of the isolated wavelengths;
 performing imaging spectroscopy on the acquired image data; and
 outputting results of the spatial imaging analysis and the imaging spectroscopy to at least one of a display device and a storage device.

13. The method of claim 12, wherein the matrix imaging device comprises a single camera having a single lens system.

14. The method of claim 12, further including:
 wherein the computing device is operatively connected to each of the matrix imaging device and the wavelength isolation module, and wherein a software program operating on the computing device controls operation of the wavelength isolation module and the matrix imaging device.

15. The method of claim 12, further comprising standardizing the matrix imaging device to compensate for nonlinearities of the matrix imaging device and nonlinearities of an optical path from the illuminated samples to the matrix imaging device.

16. The method of claim 12, further including performing the spatial imaging and imaging spectroscopy process for online measurement and control.

17. The method of claim 12, wherein selectively adapting the spatial imaging and imaging spectroscopy system to operation in at least one of a visible wavelength range and a near infrared wavelength range.

18. The method of claim 12, further including operating the spatial imaging and imaging spectroscopy system in an industrial setting comprising at least one of: textiles; pharmaceuticals; polymers; petroleum; agriculture; food; and cosmetics.

19. The method of claim 12, wherein the step of performing spatial imaging analysis based on the acquired image data includes:
 utilizing the image data corresponding to a selected one of the isolated wavelengths for performing the spatial imaging analysis.

20. The method of claim 12, wherein:
 the matrix imaging device comprises a digital camera;
 the computing device comprises a personal computer;
 the wavelength isolation module comprises a plurality of narrow band interference filters; and
 the wavelength isolation module comprises a monochromator.

* * * * *